United States Patent
Rithauddeen et al.

(10) Patent No.: US 12,180,829 B2
(45) Date of Patent: Dec. 31, 2024

(54) LEAN MONO-ETHYLENE GLYCOL (MEG) CONCENTRATION WITH PRESENCE OF INORGANIC SALT VIRTUAL METER

(71) Applicant: Saudi Arabian Oil Company, Dhahran (SA)

(72) Inventors: Megat A. Rithauddeen, Dhahran (SA); Fayez Kharbat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 768 days.

(21) Appl. No.: 17/162,431

(22) Filed: Jan. 29, 2021

(65) Prior Publication Data
US 2022/0243589 A1   Aug. 4, 2022

(51) Int. Cl.
*E21B 49/08* (2006.01)
*G01V 20/00* (2024.01)

(52) U.S. Cl.
CPC .......... *E21B 49/0875* (2020.05); *G01V 20/00* (2024.01); *E21B 2200/20* (2020.05)

(58) Field of Classification Search
None
See application file for complete search history.

(56) References Cited

U.S. PATENT DOCUMENTS

| | | | |
|---|---|---|---|
| 3,642,614 A * | 2/1972 | Van Tassell | C10G 21/28 585/839 |
| 3,653,992 A | 4/1972 | Fee et al. | |
| 4,003,215 A * | 1/1977 | Roach | F25B 15/00 62/476 |

OTHER PUBLICATIONS

Deshmukh, Larsen, and Seereeram, "Digitalized Next Generation Mono Ethylene Glycol Regeneration Systems", Society of Petroleum Engineers, Nov. 12, 2020 (Year: 2020).*

(Continued)

*Primary Examiner* — Lisa M Caputo
*Assistant Examiner* — Cynthia L Davis
(74) *Attorney, Agent, or Firm* — Fish & Richardson P.C.

(57) ABSTRACT

Systems and methods include a method and system used to predict and monitor lean mono-ethylene glycol (MEG) concentrations after a regeneration process. Process simulations are executed in a MEG regeneration system to generate intermediate parameters and a model correlating MEG concentrations and inorganic salt concentrations. A model for estimating a salt concentration build-up rate from spot samples is generated based on the process simulations. A lean MEG concentration with presence of inorganic salts is predicted in the MEG regeneration system using hybrid artificial intelligence and leveraging physics-guided machine learning.

20 Claims, 3 Drawing Sheets

(56) References Cited

OTHER PUBLICATIONS

Son et al, Simulation and Modeling of MEG (Monoethylene Glycol) Regeneration for the estimation of energy and MEG losses, Elsevier Energy, May 21, 2018 (Year: 2018).*

Seirsten et al, "Development of a Simulator for Ethylene Glycol Loops based on Solution Thermodynamics and Particle Formation Kinetics", NACE international 2010 (Year: 2010).*

Hou et al., "Operational Study of a Monoethylene Glycol (MEG) Desalination Pilot Plant. Part I: Development of a New Method for the Estimation of MEG Content in the Presence of NaCl Solid Particles," Chemical Engineering Research and Design, 2019, 146, 22 pages.

Sandengen et al., "Estimation of monoethylene glycol (MEG) content in water plus MEG plus NaCl plus NaHCO3 solutions," Journal of Chemical and Engineering Data, 2006, 51:443-447.

Zaboon et al., "Recovery of mono-ethylene glycol by distillation and the impact of dissolved salts evaluated through simulation of field data," Journal of Natural Gas Science and Engineering, 2017, 44, 28 pages.

* cited by examiner

LEAN MONO-ETHYLENE GLYCOL (MEG) CONCENTRATION WITH PRESENCE OF INORGANIC SALT VIRTUAL METER

BACKGROUND

Technical Field

The present disclosure applies to the use of mono-ethylene glycol (MEG) in oil and gas production facilities.

Background

Oil and gas companies often use MEG in wellheads and pipelines to prevent hydrate formation at pipeline conditions. As an example, in offshore deepwater gas production facilities, where the exposure to lower temperatures in subsea pipelines is common, MEG is often used for hydrate inhibition. Hydrate inhibition can be achieved by injecting MEG into a pipeline to decrease the hydrate formation temperature below the operating temperature, thereby preventing potential hydrate blockage of the pipeline. During the gas production process, lean MEG mixes with the produced water from the formation. Production fluid containing natural gas and associated condensate, produced water, and the injected MEG enters the production facility, where the fluids undergo phase separation. For example, a three-phase production separator can separate gas, hydrocarbon liquids, and the produced water and MEG mixture, commonly known as rich MEG.

SUMMARY

The present disclosure describes techniques that can be used to predict and monitor lean mono-ethylene glycol (MEG) concentrations after a regeneration process. In some implementations, a computer-implemented method includes the following. Process simulations are executed in a MEG regeneration system to generate intermediate parameters and a model correlating MEG concentrations and inorganic salt concentrations. A model for estimating a salt concentration build-up rate from spot samples is generated based on the process simulations. A lean MEG concentration with presence of inorganic salts is predicted in the MEG regeneration system using hybrid artificial intelligence and leveraging physics-guided machine learning.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. The techniques provide a reliable and accurate way to predict and monitor real-time lean MEG concentrations after a regeneration process. For example, the term real-time can correspond to events that occur within a specified period of time, such as within one minute or within an hour. This can enable better MEG estimates of lean MEG concentrations in real-time expected to be reinjected to an upstream feed gas trunkline for hydrate inhibition. The techniques provide an accurate method to predict and monitor the lean MEG concentration to be used for hydrate inhibition after the MEG regeneration process in the presence of inorganic salts using the rich MEG concentration, MEG reboiler operating conditions, solution density and electrical conductivity, estimated salt content, and flowrate from the operating MEG trains. The techniques can include the use of hybrid artificial intelligence (AI) models and can leverage physics-guided machine learning (ML) to develop best-in-class solutions to address this challenge. The techniques can use gas plant operating data and salt content estimate information to predict the lean MEG concentration feeding the upstream trunkline for hydrate inhibition purposes. The techniques can further be enhanced by collecting spot samples to train models and improve ML accuracy.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for predicting lean mono-ethylene glycol (MEG) concentrations with a presence of inorganic salts in the MEG regeneration system. The predictions can be made, for example, using hybrid artificial intelligence (AI) leveraging physics-guided machine learning (ML). Various modifications, alterations, and permutations of the disclosed implementations can be made and will be readily apparent to those of ordinary skill in the art. General principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques of the present disclosure can use rich MEG concentrations at a given pressure and temperature and initial dissolved inorganic salts concentration to estimate salt concentration build-up rates. The estimates can be based on spot samples analyzed and subsequently used as an input to a live soft-sensor to correct lean MEG concentration calculations. Rigorous process simulations can be used to generate the necessary intermediate parameters and mathematical and statistical models which are eventually employed to predict the lean MEG concentration. The predictions can use the MEG regeneration system and estimate of the lean MEG concentration expected to be reinjected to the upstream feed gas trunkline for hydrate inhibition. Techniques can also include the sending of notifications and escalations to optimize MEG system operations that integrate complex networks into a single model.

Selected best technologies and methods can be used to develop hybrid AI models, leveraging physics-guided ML. A contextualized data foundation layer can be designed and used to provide clean and reliable data for the ML models. An agile framework can be created to predict the lean MEG in the MEG regeneration system by breaking the problem statement into three minimum viable products (MVPs), one of them being the MEG concentration soft-sensor.

Overall, the model described can use the rich MEG concentration, inorganic salts concentration (particularly sodium chloride (NaCl)), reboiler operating pressure, and temperature to predict the lean MEG concentration at the outlet of the MEG regeneration system. The inorganic salts concentration can initially be based on spot sample data by measuring density and electrical conductivity to estimate initial MEG fraction and salt content.

The initial lean MEG concentration data without salt content can be generated by a vigorous process simulation. Plant operating data can be used to develop process models. The models can be tuned to match at least one operating condition. The models can then be used to predict the lean MEG concentration with hourly or daily matches based on plant operating conditions. The models can be improved by using historical spot samples including electrical conductivity and density to calculate the lean MEG concentration with an estimated salt concentration.

The salt concentration can be estimated using a combination of a linear model and an empirical correlation equation that can predict the salt content on the basis of density and electrical conductivity of the MEG solution. The salt concentration can be a primary input to a live soft-sensor which can use an estimate of the salt concentration to correct the MEG concentration estimate. Since there is no online measurement of the composition of salts in the MEG solution, for simplicity purposes it can be assumed that all the salt consists of sodium chloride. In actual cases, the salt can include heavier salt components. The salt concentration can be adjusted if new information becomes available.

A mathematical or statistical model can be developed to correlate the rich MEG concentration, estimated salt content, reboiler operating pressure, and temperature of the MEG regeneration system, to the amount of lean MEG concentration. At least one lean MEG concentration data can be used to tune the model.

The mathematical or statistical lean MEG concentration model can then be used to predict or monitor the MEG regeneration unit performance at a plant. The model output can be used to predict an expected MEG concentration of lean MEG after the regeneration for the particular operating condition. The prediction can consider the estimated salt content and upper and lower uncertainty limits based on a vigorous process simulation.

The model output from each operating MEG train can then be added together and can consider the product flowrate to establish an expected lean MEG concentration to be reinjected back to the upstream feed gas pipeline during hydrate inhibition. The model output can be used to generate notifications and escalations to optimize MEG system operation that integrates complex networks into a single model.

Figure 1:
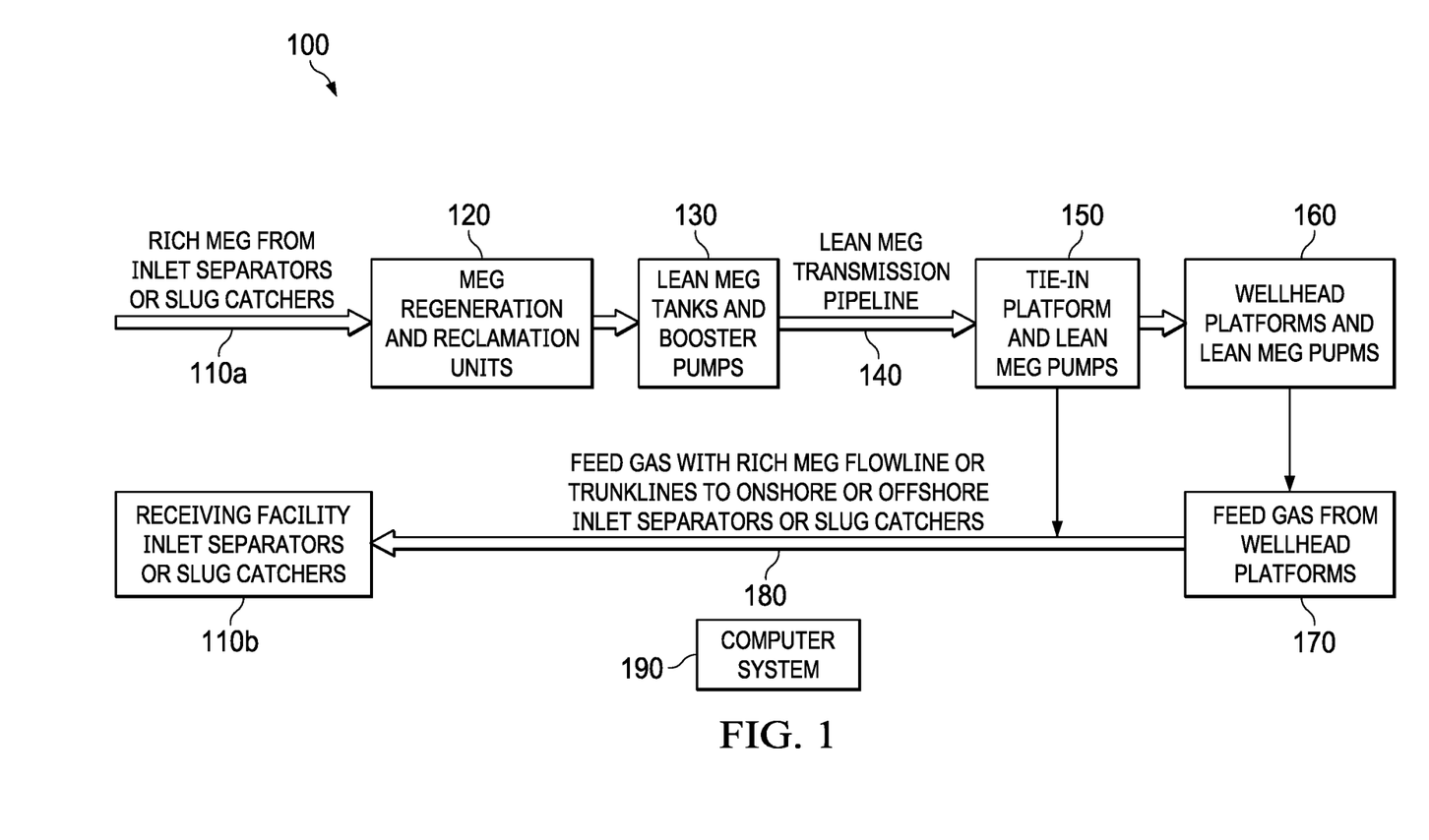
FIG. 1 is a flow diagram of a workflow for using mono-ethylene glycol (MEG) in oil and gas production facilities, according to some implementations of the present disclosure.

FIG. 1 is a flow diagram of a workflow 100 for using MEG in oil and gas production facilities, according to some implementations of the present disclosure. At 110a, rich MEG that is output by inlet separators or slug catchers is received at MEG regeneration and reclamation units 120. Lean MEG tanks and booster pumps 130 use a lean MEG transmission pipeline 140 to provide lean MEG to tie-in platforms and lean MEG pumps 150. Wellhead platforms and lean MEG pumps 160 feed lean MEG to wellhead platforms 170. The wellhead platforms 170 provide feed gas 180 with rich MEG flowline or trunklines to onshore or offshore inlet separators or slug catchers. The feed gas with rich MEG is received at receiving facility inlet separators or slug catchers 110b. The workflow 100 is controlled by a computer system 190.

Figure 2:
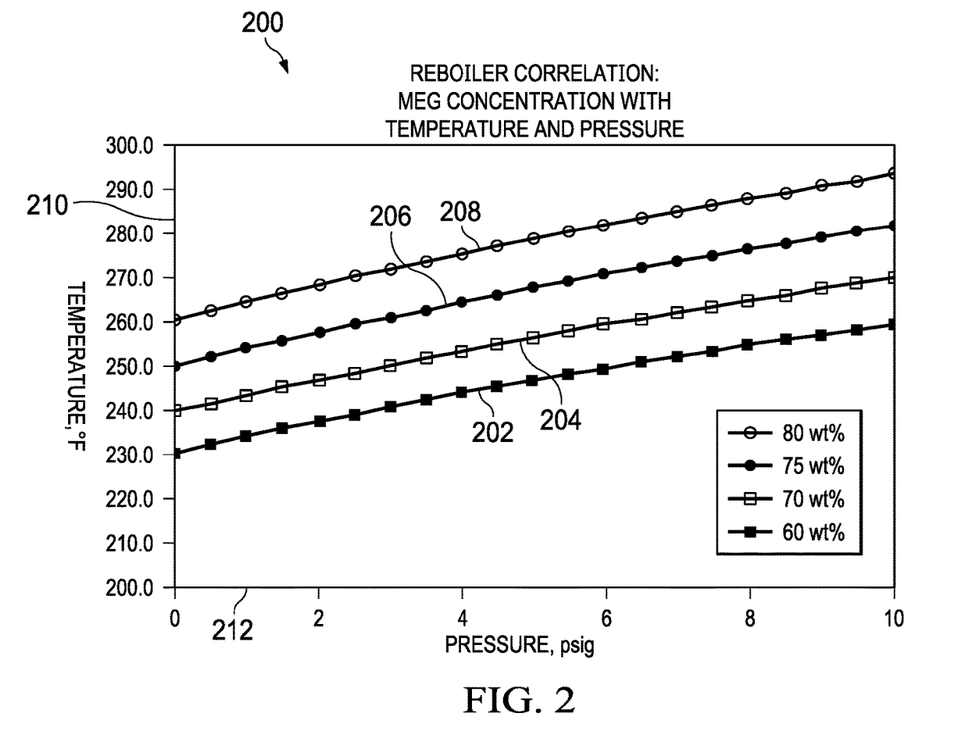
FIG. 2 is a graph showing examples of plots corresponding to different MEG concentrations, according to some implementations of the present disclosure.

FIG. 2 is a graph 200 showing examples of plots 202, 204, 206, and 208 corresponding to different MEG concentrations, according to some implementations of the present disclosure. For example, the plots 202, 204, 206, and 208 correspond to weight (wt) percentages (%) of 60, 70, 75, and 80 percent, respectively. The graph 100 provides a reboiler correlation of different MEG concentrations at different combinations of temperature and pressure. The plots 202, 204, 206, and 208 are plotted relative to a temperature axis 210 (for example, in degrees Fahrenheit) and a pressure axis 212 (for example, in pounds per square inch gauge (psig)).

Figure 3:
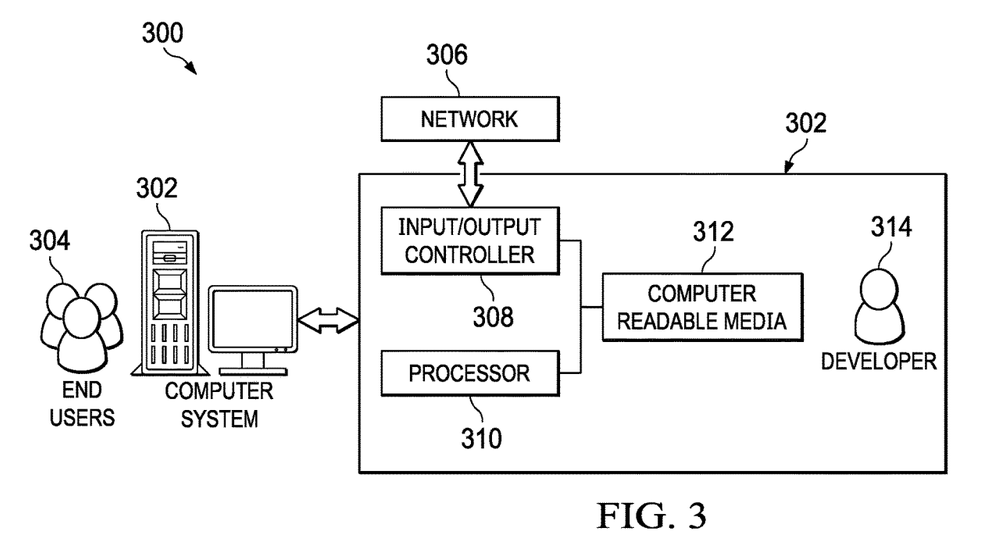
FIG. 3 is a block diagram showing an example of a system for executing the methods and systems of the present disclosure, according to some implementations of the present disclosure.

FIG. 3 is a block diagram showing an example of a system 300 for executing the methods and systems of the present disclosure, according to some implementations of the present disclosure. The system includes at least one computer 302 that is used by end users 304, such as operators of oil and gas production facilities. The computer 302 can communicate with other systems, for example, through a network 306 (for example, implemented as network 530). The computer system 302 includes an input/output controller 308 for sending and receiving data, a processer 310 for processing computer instructions, and a computer readable medium 312 (for example, for storing the computer instructions). One or more developers 314 can develop applications that provide and correspond to the computer instructions.

Figure 4:
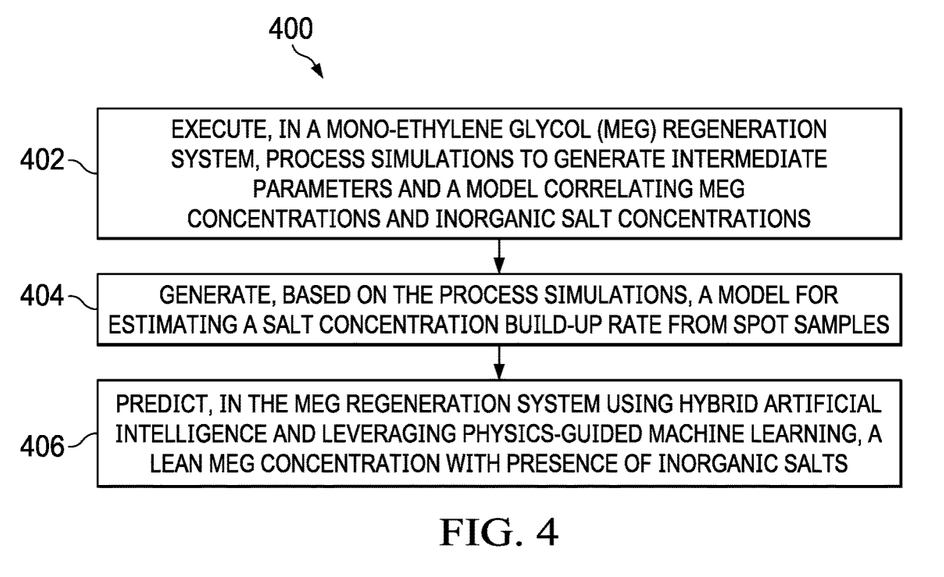
FIG. 4 is a flowchart of an example of a method for predicting a lean MEG concentration with presence of inorganic salts, according to some implementations of the present disclosure.

FIG. 4 is a flowchart of an example of a method 400 for predicting a lean MEG concentration with presence of inorganic salts, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, process simulations are executed in a MEG regeneration system to generate intermediate parameters and a model correlating MEG concentrations and inorganic salt concentrations. As an example, executing the process simulations can include using rich MEG concentrations at a given pressure and temperature and initial dissolved inorganic salts concentration. From 402, method 400 proceeds to 404.

At 404, a model for estimating a salt concentration build-up rate from spot samples is generated based on the process simulations. For example, the spot samples can include data measuring density and electrical conductivity to estimate initial MEG fraction and salt content. From 404, method 400 proceeds to 406.

At 406, a lean MEG concentration with presence of inorganic salts is predicted in the MEG regeneration system using hybrid artificial intelligence and leveraging physics-guided machine learning. For example, predicting the lean MEG concentration can include estimating a lean MEG concentration expected to be reinjected into an upstream feed gas trunkline for hydrate inhibition. After 406, method 400 can stop.

In some implementations, method 400 further includes generating notifications and escalations to optimize MEG system operation. For example, based on the prediction, the MEG regeneration system can include notifications that are sent to engineers as email messages or text messages. Further, messages can me escalated to other systems that control events and processing in the MEG regeneration system.

In some implementations, method 400 further includes providing an input to a live soft-sensor to correct a lean MEG concentration calculation. As an example, the prediction that is made can be used to update other calculations or assumptions about the predicted lean MEG concentration.

Figure 5:
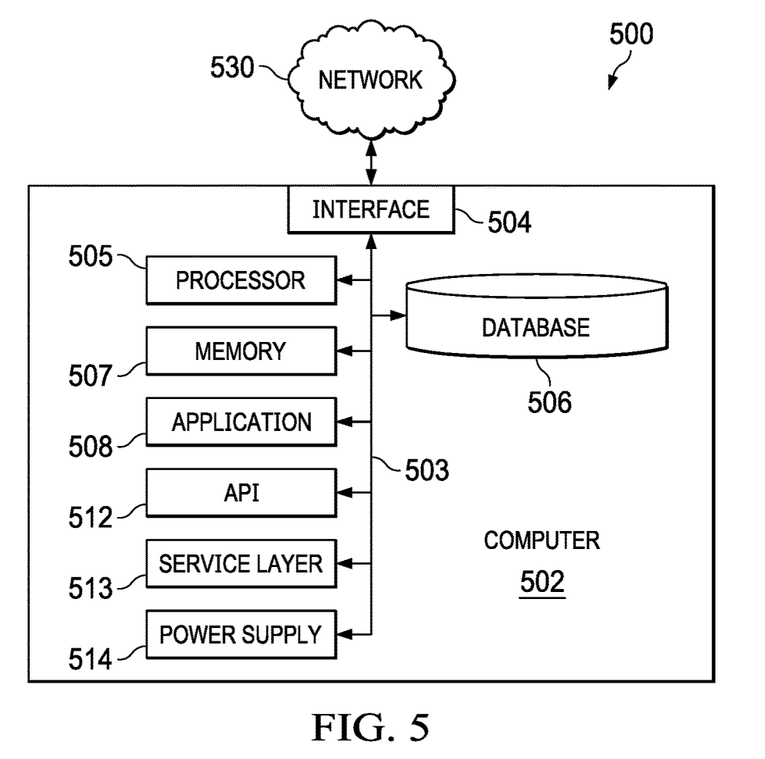
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. Process simulations are executed in a MEG regeneration system to generate intermediate parameters and a model correlating MEG concentrations and inorganic salt concentrations. A model for estimating a salt concentration build-up rate from spot samples is generated based on the process simulations. A lean MEG concentration with presence of inorganic salts is predicted in the MEG regeneration system using hybrid artificial intelligence and leveraging physics-guided machine learning.

The foregoing and other described implementations can each, optionally, include one or more of the following features:

A first feature, combinable with any of the following features, the method further including generating notifications and escalations to optimize MEG system operation.

A second feature, combinable with any of the previous or following features, where notifications and escalations to optimize MEG system operation include notifications and escalations sent to wellhead platforms and used as inputs to adjust parameters during operations.

A third feature, combinable with any of the previous or following features, where predicting the lean MEG concentration includes estimating a lean MEG concentration expected to be reinjected into an upstream feed gas trunkline for hydrate inhibition.

A fourth feature, combinable with any of the previous or following features, where executing the process simulations includes uses rich MEG concentrations at a given pressure and temperature and initial dissolved inorganic salts concentration.

A fifth feature, combinable with any of the previous or following features, the method further including providing an input to a live soft-sensor to correct a lean MEG concentration calculation.

A sixth feature, combinable with any of the previous or following features, where the spot samples include data measuring density and electrical conductivity to estimate initial MEG fraction and salt content.

In a second implementation, a non-transitory, computer-readable medium stores one or more instructions executable by a computer system to perform operations including the following. Process simulations are executed in a MEG regeneration system to generate intermediate parameters and a model correlating MEG concentrations and inorganic salt concentrations. A model for estimating a salt concentration build-up rate from spot samples is generated based on the process simulations. A lean MEG concentration with presence of inorganic salts is predicted in the MEG regeneration system using hybrid artificial intelligence and leveraging physics-guided machine learning.

The foregoing and other described implementations can each, optionally, include one or more of the following features:

A first feature, combinable with any of the following features, the operations further including generating notifications and escalations to optimize MEG system operation.

A second feature, combinable with any of the previous or following features, where notifications and escalations to optimize MEG system operation include notifications and escalations sent to wellhead platforms and used as inputs to adjust parameters during operations.

A third feature, combinable with any of the previous or following features, where predicting the lean MEG concentration includes estimating a lean MEG concentration expected to be reinjected into an upstream feed gas trunkline for hydrate inhibition.

A fourth feature, combinable with any of the previous or following features, where executing the process simulations includes uses rich MEG concentrations at a given pressure and temperature and initial dissolved inorganic salts concentration.

A fifth feature, combinable with any of the previous or following features, the operations further including providing an input to a live soft-sensor to correct a lean MEG concentration calculation.

A sixth feature, combinable with any of the previous or following features, where the spot samples include data measuring density and electrical conductivity to estimate initial MEG fraction and salt content.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Process simulations are executed in a MEG regeneration system to generate intermediate parameters and a model correlating MEG concentrations and inorganic salt concentrations. A model for estimating a salt concentration build-up rate from spot samples is generated based on the process simulations. A lean MEG concentration with presence of inorganic salts is predicted in the MEG regeneration system using hybrid artificial intelligence and leveraging physics-guided machine learning.

The foregoing and other described implementations can each, optionally, include one or more of the following features:

A first feature, combinable with any of the following features, the operations further including generating notifications and escalations to optimize MEG system operation.

A second feature, combinable with any of the previous or following features, where notifications and escalations to optimize MEG system operation include notifications and escalations sent to wellhead platforms and used as inputs to adjust parameters during operations.

A third feature, combinable with any of the previous or following features, where predicting the lean MEG concentration includes estimating a lean MEG concentration expected to be reinjected into an upstream feed gas trunkline for hydrate inhibition.

A fourth feature, combinable with any of the previous or following features, where executing the process simulations includes uses rich MEG concentrations at a given pressure and temperature and initial dissolved inorganic salts concentration.

A fifth feature, combinable with any of the previous or following features, the operations further including providing an input to a live soft-sensor to correct a lean MEG concentration calculation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   receiving, by one or more processors and from sensors, spot samples comprising electrical conductivity and density of mono-ethylene glycol (MEG) concentrations in a transmission pipeline of an industrial plant;
   executing, by the one or more processors, process simulations to generate intermediate parameters and a correlation model correlating the MEG concentrations and inorganic salt concentrations;
   generating, by the one or more processors, based on the process simulations, a model for estimating a salt concentration build-up rate from the spot samples, the model defining an estimated variation of the MEG concentrations matched over time to plant operating conditions;
   predicting, by the one or more processors using hybrid artificial intelligence and physics-guided machine learning, a lean MEG concentration with presence of inorganic salts by correlating the estimated variation of the MEG concentrations at an outlet of a MEG regeneration system, to the salt concentration build-up rate, a reboiler operating pressure, and a temperature of the MEG regeneration system, to determine an amount of the lean MEG concentration at the outlet of the MEG regeneration system; and
   providing, by the one or more processors, an instruction to adjust plant operating conditions to resolve an inhibition of the transmission pipeline.

2. The computer-implemented method of claim 1, further comprising:
   generating notifications and escalations to optimize MEG system operation.

3. The computer-implemented method of claim 2, wherein notifications and escalations to optimize MEG system operation comprise notifications and escalations sent to wellhead platforms and used as inputs to adjust parameters during operations.

4. The computer-implemented method of claim 1, wherein predicting the lean MEG concentration comprises estimating a lean MEG concentration expected to be reinjected into an upstream feed gas trunkline for hydrate inhibition.

5. The computer-implemented method of claim 1, wherein executing the process simulations comprises using rich MEG concentrations at a given pressure and temperature and initial dissolved inorganic salts concentration.

6. The computer-implemented method of claim 1, further comprising providing an input to a live soft-sensor to correct a lean MEG concentration calculation.

7. The computer-implemented method of claim 1, wherein the spot samples comprise data measuring density and electrical conductivity to estimate initial MEG fraction and salt content.

8. A non-transitory, computer-readable medium storing one or more instructions executable by a computer system to perform operations comprising:
   receiving, from sensors, spot samples comprising electrical conductivity and density of mono-ethylene glycol (MEG) concentrations in a transmission pipeline of an industrial plant;
   executing, process simulations to generate intermediate parameters and a correlation model correlating the MEG concentrations and inorganic salt concentrations;
   generating based on the process simulations, a model for estimating a salt concentration build-up rate from the spot samples, the model defining an estimated variation of the MEG concentrations matched over time to plant operating conditions;
   predicting, using hybrid artificial intelligence and physics-guided machine learning, a lean MEG concentration with presence of inorganic salts by correlating the estimated variation of the MEG concentrations at an outlet of a MEG regeneration system, to the salt concentration build-up rate, a reboiler operating pressure, and a temperature of the MEG regeneration system, to determine an amount of the lean MEG concentration at the outlet of the MEG regeneration system; and providing an instruction to adjust plant operating conditions to resolve an inhibition of the transmission pipeline.

9. The non-transitory, computer-readable medium of claim 8, the operations further comprising:
generating notifications and escalations to optimize MEG system operation.

10. The non-transitory, computer-readable medium of claim 9, wherein notifications and escalations to optimize MEG system operation comprise notifications and escalations sent to wellhead platforms and used as inputs to adjust parameters during operations.

11. The non-transitory, computer-readable medium of claim 8, wherein predicting the lean MEG concentration comprises estimating a lean MEG concentration expected to be reinjected into an upstream feed gas trunkline for hydrate inhibition.

12. The non-transitory, computer-readable medium of claim 8, wherein executing the process simulations comprises using rich MEG concentrations at a given pressure and temperature and initial dissolved inorganic salts concentration.

13. The non-transitory, computer-readable medium of claim 8, the operations further comprising providing an input to a live soft-sensor to correct a lean MEG concentration calculation.

14. The non-transitory, computer-readable medium of claim 8, wherein the spot samples comprise data measuring density and electrical conductivity to estimate initial MEG fraction and salt content.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, from sensors, spot samples comprising electrical conductivity and density of mono-ethylene glycol (MEG) concentrations in a transmission pipeline of an industrial plant;
executing, process simulations to generate intermediate parameters and a correlation model correlating the MEG concentrations and inorganic salt concentrations;
generating based on the process simulations, a model for estimating a salt concentration build-up rate from the spot samples, the model defining an estimated variation of the MEG concentrations matched over time to plant operating conditions;
predicting, using hybrid artificial intelligence and physics-guided machine learning, a lean MEG concentration with presence of inorganic salts by correlating the estimated variation of the MEG concentrations at an outlet of a MEG regeneration system, to the salt concentration build-up rate, a reboiler operating pressure, and a temperature of the MEG regeneration system, to determine an amount of the lean MEG concentration at the outlet of the MEG regeneration system; and
providing an instruction to adjust plant operating conditions to resolve an inhibition of the transmission pipeline.

16. The computer-implemented system of claim 15, the operations further comprising:
generating notifications and escalations to optimize MEG system operation.

17. The computer-implemented system of claim 16, wherein notifications and escalations to optimize MEG system operation comprise notifications and escalations sent to wellhead platforms and used as inputs to adjust parameters during operations.

18. The computer-implemented system of claim 15, wherein predicting the lean MEG concentration comprises estimating a lean MEG concentration expected to be reinjected into an upstream feed gas trunkline for hydrate inhibition.

19. The computer-implemented system of claim 15, wherein executing the process simulations comprises using rich MEG concentrations at a given pressure and temperature and initial dissolved inorganic salts concentration.

20. The computer-implemented system of claim 15, the operations further comprising providing an input to a live soft-sensor to correct a lean MEG concentration calculation.

* * * * *